United States Patent [19]

Moller

[11] Patent Number: 5,705,948
[45] Date of Patent: Jan. 6, 1998

[54] SELF CLOCKING, VARIABLE FREQUENCY BOOST CIRCUIT

[75] Inventor: David Dale Moller, Westfield, Ind.

[73] Assignee: Delco Electronics Corporation, Kokomo, Ind.

[21] Appl. No.: 625,154

[22] Filed: Apr. 1, 1996

[51] Int. Cl.$^6$ .................................................. H02M 3/157
[52] U.S. Cl. ........................... 327/589; 327/390; 363/80
[58] Field of Search ........................ 327/390, 534, 327/535, 536, 537, 541, 543, 589; 363/80, 84, 89; 323/313

[56] References Cited

U.S. PATENT DOCUMENTS

| | | | |
|---|---|---|---|
| 4,980,576 | 12/1990 | Rossi et al. ................ | 327/530 |
| 5,559,395 | 9/1996 | Venkitasubrahmanian et al. ... | 315/247 |
| 5,572,416 | 11/1996 | Jacobs et al. ................ | 363/89 |
| 5,610,502 | 3/1997 | Tallant, II et al. ........... | 323/222 |
| 5,615,098 | 3/1997 | Ishii et al. .................. | 363/89 |

*Primary Examiner*—Terry Cunningham
*Attorney, Agent, or Firm*—Mark A. Navarre

[57] ABSTRACT

A boost circuit effects increasing current flow through an inductor and a switch when the switch is closed, and then, when the switch is open, directs the inductor current through a diode to charge a storage capacitor at the output. A logic circuit operates the switch. The switch is controlled on by sensing low current flow in the capacitor and off by sensing high current flow in the switch, so that inductor current is continuous.

7 Claims, 2 Drawing Sheets

SELF CLOCKING, VARIABLE FREQUENCY BOOST CIRCUIT

FIELD OF THE INVENTION

This invention relates to a boost power supply circuit and particularly to such circuits having minimal electromagnetic emissions.

BACKGROUND OF THE INVENTION

Automotive electronic circuits are supplied by the vehicle battery which has a nominal value of about 12 volts and varies somewhat from that level. In some applications a consistent voltage or a higher voltage is required. A known boost circuit to ensure the desired voltage comprises an inductor coupled to battery voltage and has its current interrupted by a switch in a manner that induces voltage greater than the battery voltage. The resulting pulses of inductor current incrementally charge a capacitor up to a desired output voltage where the switching is suspended. The switch is operated at a fixed frequency which generally allows each pulse of inductor current to decay to zero before the switch is closed to initiate another pulse.

The known circuit requires the use of an oscillator, a timing generator and an integrator including an external capacitor used to stabilize the loop. This results in a larger more costly circuit design relative to one which does not need such components. The known boost circuit can result in subharmonics being introduced to the vehicle harness, as well as operation in the discontinuous mode where the inductor current goes to zero in each cycle. Both of these phenomena result in increased conducted electromagnetic emission levels.

SUMMARY OF THE INVENTION

It is therefore an object of the invention to boost voltage in a power supply without causing electromagnetic emissions. It is a further object in such a power supply to operate in a continuous mode. Another object is to implement such an improved power supply at a reduced cost relative to conventional boost power supplies.

An inductor is connected in series with a switch and a vehicle power supply to effect current flow in the inductor when the switch is closed, and the inductor is further connected through at least one diode to at least one storage capacitor at the booster output so that inductor current flows to the capacitors when the switch is open. A drive circuit controls the switch and has a first input for opening the switch and a second input for closing the switch. A current sensor senses current flow through the switch and a comparator issues a turn-off signal to the first input when the current reaches a desired maximum. Another current sensor senses current flow in a storage capacitor and a comparator issues a turn-on signal to the second input when the current reaches a desired minimum which is greater than zero. In that manner the switch is operated to ensure that the inductor current is continuous, i.e., not decaying to zero at each pulse, thereby minimizing electromagnetic emission. At the same time, separate oscillator and timing circuits for switch closure are eliminated to simplify the circuit. Another comparator sensitive to output voltage is effective to disable the switching when a desired maximum output voltage is achieved, thereby obviating the requirement of an integrator with an external capacitor as used for that purpose in conventional booster circuits.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
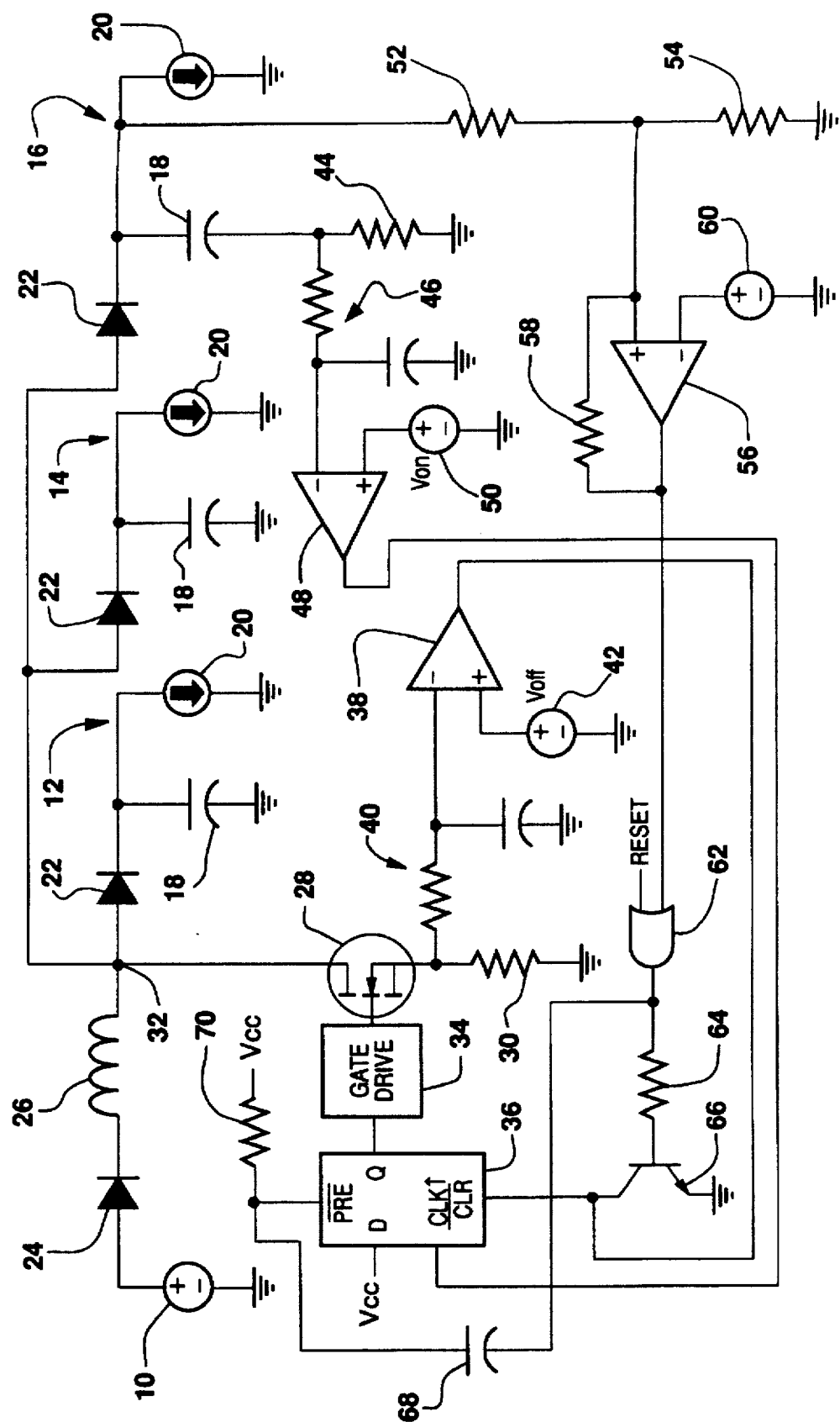
FIG. 1 is a schematic circuit diagram of a booster power supply according to the invention.

Referring to FIG. 1, a power supply for automotive use is supplied by a vehicle battery 10 having a nominal voltage of about 12 volts but being subject to substantial voltage variations. The output of the power supply is intended to be at a higher voltage, say 25 volts. In this example there are three outputs 12, 14 and 16, each comprising a storage capacitor 18 charged to an output voltage and a current load 20. Each output is coupled by a blocking diode 22 to a charging circuit. The charging circuit comprises the battery 10 a diode 24, an inductor 26 a switching transistor or FET 28 and a current sense resistor 30 in series. The blocking diodes 22 are connected to the node 32 of the inductor 26 and the transistor 28. The transistor will be turned on and off repeatedly so that first increasing current flow will occur through the inductor 26 and the FET while the diodes 22 are back-biased, and then the FET switch is opened so that the inductor current will continue to flow but now through the diodes 22 to charge the storage capacitors 18. The transistor 28 is controlled by a gate control circuit comprising a gate drive 34 which supplies enough current gain to quickly enable and disable the transistor. The gate drive in turn is controlled by the Q output of a D flip-flop 36. As thus far described the boost circuit is the classic power supply boost circuit and its operation is well known to those skilled in the art.

The data input (D) of the flip-flop 36 is coupled to the regulated voltage $V_{cc}$ so that a high-going signal asserted on the clock (CLK) input will result in a logic 1 at the Q output, and a low-going signal on the /CLR input will set the Q output to logic 0. In addition a preset (/PRE) input will set the Q output to logic 1 when a low-going signal is applied.

A self-clocking scheme for switching the FET 28 enhances the circuit operation while reducing its size and cost since separate oscillator and timing circuits are not needed. The FET 28 is turned off by a comparator 38 having one input coupled by an RC filter 40 to the voltage on the current sense resistor 30. The other input of the comparator is connected to a reference voltage 42 and the output is connected to the /CLR input. Thus when the FET is conducting and the inductor current through the FET is increasing, the comparator output will go low at a preset current value to clear the Q output of the flip-flop and thus turn off the FET. It is generally desired to set the comparator reference voltage ($V_{OFF}$) to a value approximately corresponding to the saturation current of the inductor to avoid operating in saturation.

To turn on the FET before the inductor current decays to zero, a current sensing resistor 44 in series with one of the storage capacitors 18 develops a voltage corresponding to the capacitor current. That voltage is coupled through an RC filter 46 to the negative input of a comparator 48, the positive input being coupled to a reference voltage 50 which is chosen to correspond to a low capacitor charging current. The comparator 48 output is connected to the CLK input of the flip-flop 36. Thus when voltage representing the capacitor current falls below the reference voltage ($V_{ON}$), the comparator output goes high causing the flip-flop Q output to go to logic 1 to turn on the FET 28.

Figure 2:
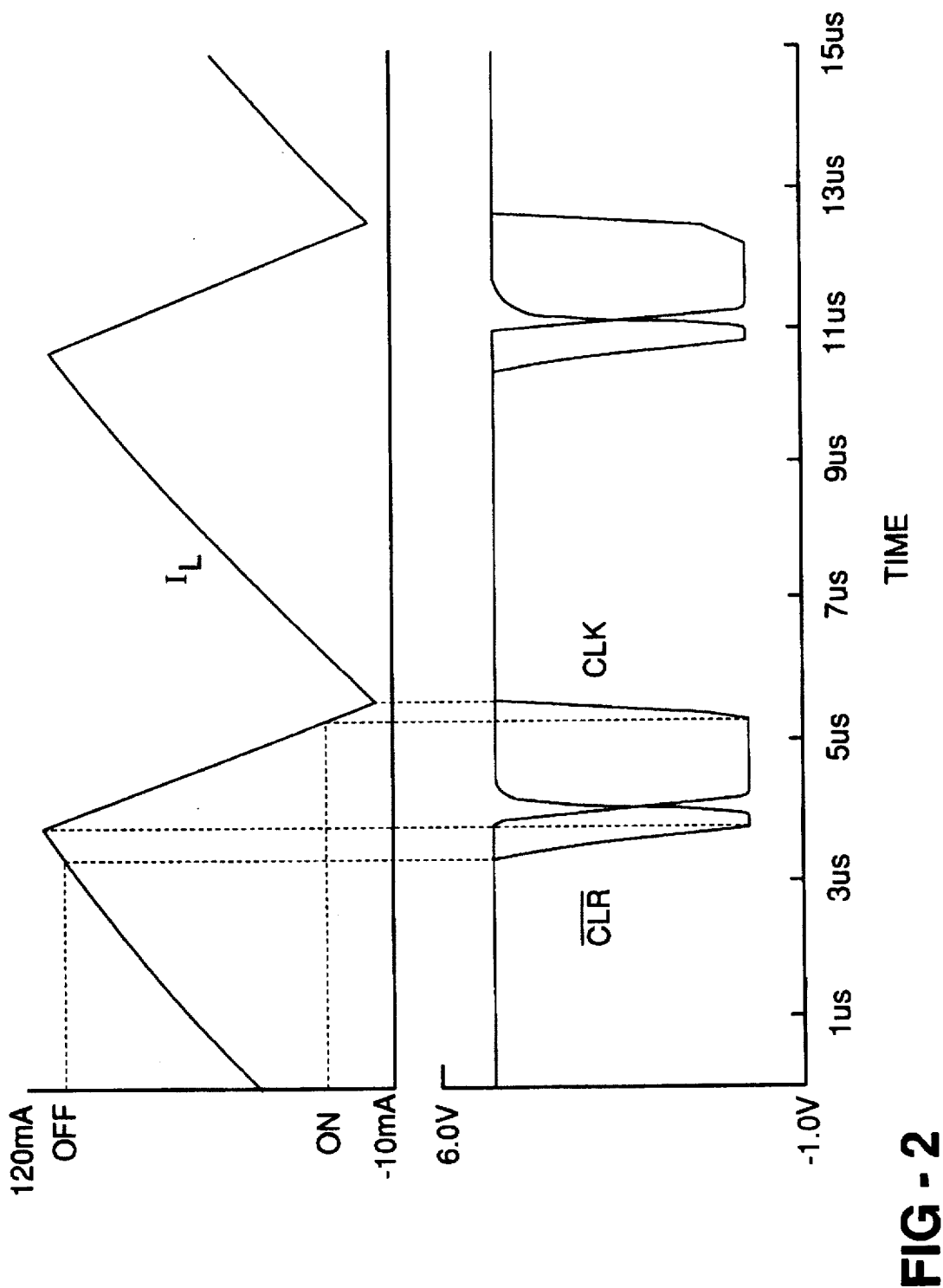
FIG. 2 is a waveform diagram illustrating circuit operation.

The graphs of FIG. 2 show the inductor current $I_L$ and the voltages applied to the flip-flop inputs /CLR and CLK. When the current $I_L$ reaches the Off level determined by $V_{OFF}$ the comparator 38 goes low. Due to propagation and logic time delay the /CLR becomes low enough to switch the Q output a short time later so that the current goes slightly beyond the Off level when the switch 28 turns off. Then the comparator 38 turns on and the /CLR voltage quickly rises. Next the capacitor current begins to flow, turning the comparator 48 off. When the inductor current flowing in the capacitor decreases to the On level, the comparator 48 then turns on to increase the CLK voltage. Again a time delay allows the current to go beyond the threshold level, and then the flip-flop activates the switch 28 to repeat the cycle.

By setting the reference voltage 50 to a value representing a positive charging voltage, the inductor current is caused to increase due to the FET switching on before the current can ever decay to zero. As result, the electromagnetic emissions of the boost circuit are minimized. The frequency of switching will vary in dependence on the output voltage as well as the load current during any given cycle. At low output voltage, experienced when the circuit is just initially charging the storage capacitor, the frequency tends to be lower than that which occurs when the voltage approaches the limit value. A higher frequency occurs for high loads which divert inductor current from capacitor charging. In any circumstance the self-clocking feature enables the inductor current to flow continuously so long as the gate drive is enabled.

To control the maximum output voltage to the desired value, a circuit is provided to disable the gate control circuit when the desired voltage is attained, and to reenable the control circuit when the voltage falls below the desired value. A voltage divider comprising a series pair of resistors 52 and 54 is connected between the output 16 and ground. The resistor junction, which affords a measure of the output voltage, is connected to the positive input of a comparator 56, which input is also coupled to the output by a feedback resistor 58 to achieve hysteresis. The negative input of the comparator 56 is connected to a reference voltage 60 which corresponds to a junction voltage which represents the desired maximum voltage of output 16. The comparator 56 output is connected via an OR gate 62 and a base limiting current resistor 64 to an NPN transistor 66 which is coupled between ground and the /CLR input of the flip-flop 36. A high voltage from the OR gate will turn on the transistor 66 to apply a low voltage to /CLR to clear the Q output and disable the FET 28 for as long as the OR gate output is high. The OR gate output is also connected through a capacitor 68 to the /PRE input, and a resistor 70 couples the /PRE input to $V_{cc}$. The /PRE input is normally held positive by the resistor 70 but when the OR gate output goes low (when the comparator 56 turns off), the low-going signal will be transmitted by the capacitor 68 to the /PRE input to preset the Q output to logic 1, thereby enabling the FET. Thus the FET is disabled when the output voltage as sensed by the comparator 56 is at a maximum value and is again enabled when the voltage drops to overcome the comparator hysteresis.

Thus it will be seen that the boost circuit efficiently switches without a timing generator and oscillator by monitoring the switch current and the storage capacitor current, and moreover that continuous inductor current is maintained until target voltage is attained and switching is halted. Thus electromagnetic emissions are minimized.

The embodiments of the invention in which an exclusive property or privilege is claimed are defined as follows:

1. A boost power supply for producing an output voltage at an output higher than a supply voltage at an input comprising:

an inductor and a diode joined at a node and serially coupled between an input and an output;

a storage capacitor coupled between the output and ground;

a switch connected between the node and ground whereby inductor current flows through the switch at increasing values when the switch is closed to attain a peak value and then when the switch is open inductor current flows through the diode to the output at decreasing values to charge the capacitor;

a control circuit for operating the switch including
   means responsive to the current flow through the switch for opening the switch when the current flow through the switch attains a set maximum value, and
   means responsive to current flow through the storage capacitor for closing the switch when the current flow through the capacitor decreases to a set value;
   whereby the storage capacitor current and the switch current determine switch cycling.

2. The invention as defined in claim 1 wherein:

the control circuit includes a logic circuit for operating the switch; and each of the means responsive to current flow supplies a logic input to the logic circuit to effect switch closing and opening.

3. The invention as defined in claim 2 including means for limiting the output voltage comprising:

comparator means responsive to a measure of the output voltage and to a threshold voltage for producing a signal when the measure of the output voltage reaches the threshold voltage and terminating the signal when the measure of the output voltage falls to a value below the threshold voltage; and means for coupling the signal to the logic circuit hold open the switch as long as the signal is produced.

4. The invention as defined in claim 1 wherein:

the control circuit includes a logic circuit for operating the switch; and the means responsive to current flow through the storage capacitor includes a circuit for sensing capacitor current flow and for producing an input to the logic circuit when the capacitor current flow decreases to a set value.

5. The invention as defined in claim 4 wherein the means responsive to current flow through the storage capacitor comprises:

a current sensing resistor in series with the capacitor for developing a voltage correlated to capacitor current flow; and a comparator coupled to the current sensing resistor for comparing the developed voltage to a threshold voltage, whereby the comparator output comprises the input to the logic circuit and changes state when the capacitor current passes through the set value.

6. The invention as defined in claim 1 wherein:

the control circuit includes a logic circuit for operating the switch; and the means responsive to current flow through the switch for closing the switch senses switch current flow and for producing an input to the logic circuit when the switch current flow increases to a set value.

7. The invention as defined in claim 6 wherein the means responsive to the current flow through the switch for opening the switch comprises:

a current sensing resistor in series with the switch for developing a voltage correlated to switch current flow; and a comparator coupled to the current sensing resistor for comparing the developed voltage to a threshold voltage, whereby the comparator output comprises the input to the logic circuit and changes state when the voltage correlated to switch current passes through the threshold voltage.

* * * * *